United States Patent [19]

Marchesi

[11] 4,091,622
[45] May 30, 1978

[54] COMBINED DAY AND NIGHT SOLAR ENERGY SYSTEM

[76] Inventor: Carlo M. Marchesi, 31 Winter St., Saugus, Mass. 01906

[21] Appl. No.: 745,830

[22] Filed: Nov. 29, 1976

Related U.S. Application Data

[63] Continuation-in-part of Ser. No. 597,820, Jul. 21, 1975, abandoned.

[51] Int. Cl.$^2$ ............................................. F03G 7/02
[52] U.S. Cl. ........................................ 60/641; 60/659; 126/271; 165/9.1; 165/104 S; 165/DIG. 4
[58] Field of Search .................. 60/641, 659; 126/270, 126/271; 165/DIG. 4, 104 S, 9.1

[56] References Cited

U.S. PATENT DOCUMENTS

| 603,317 | 5/1898 | Calver | 126/270 |
| 608,755 | 8/1898 | Cottle | 126/270 |

*Primary Examiner*—Allen M. Ostrager
*Attorney, Agent, or Firm*—Clarence A. O'Brien; Harvey B. Jacobson

[57] ABSTRACT

A solar heat wave energy system having a solar energy collector that collects energy from the sun to heat a boiler which in turn runs a steam turbine generator for generating electricity during the daytime. The system also has an assembly for generating electricity during the nighttime, which assembly includes a storage structure disposed between the solar collector and the boiler. This storage structure includes a plurality of separate storage stacks, each housed underground and including a plurality of heat conductive pipes interdigitally arranged with a plurality of plates constructed from twice-baked clay and arranged resting on a base formed from a similar clay as the plates. Solar energy is absorbed by the collector and transferred to the storage structure by means of suitable piping for storage in the twice-baked clay plates. When the stored heat is to be later used, as in the nighttime or on overcast days, a switching device uncouples the collector from the storage structure and couples the storage structure to the boiler.

8 Claims, 11 Drawing Figures

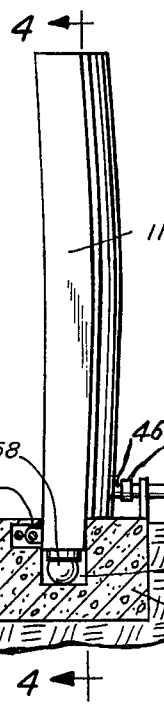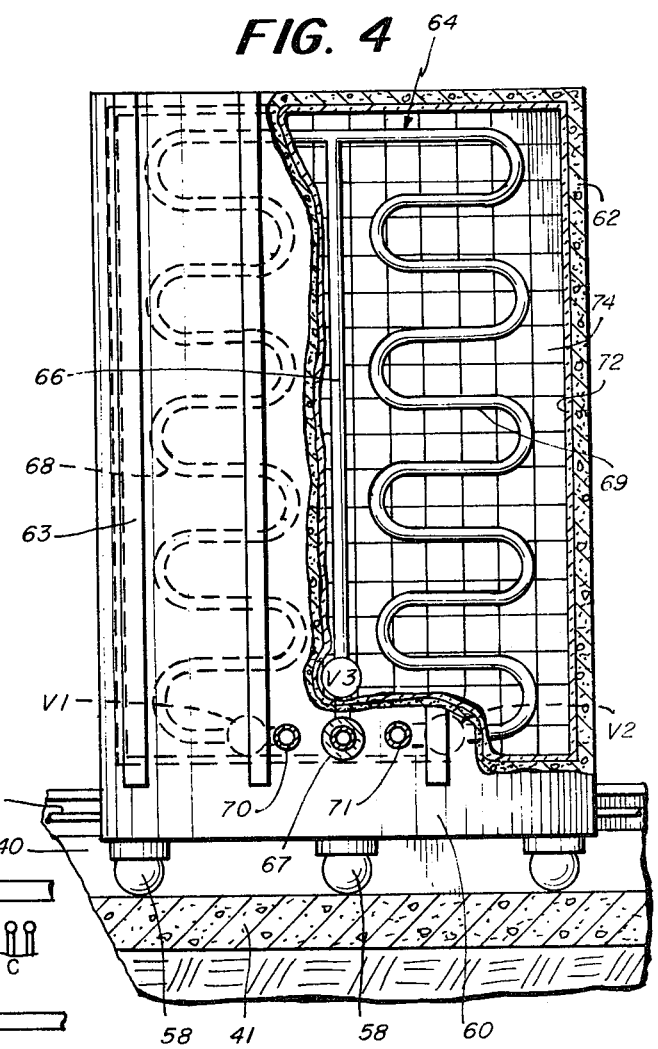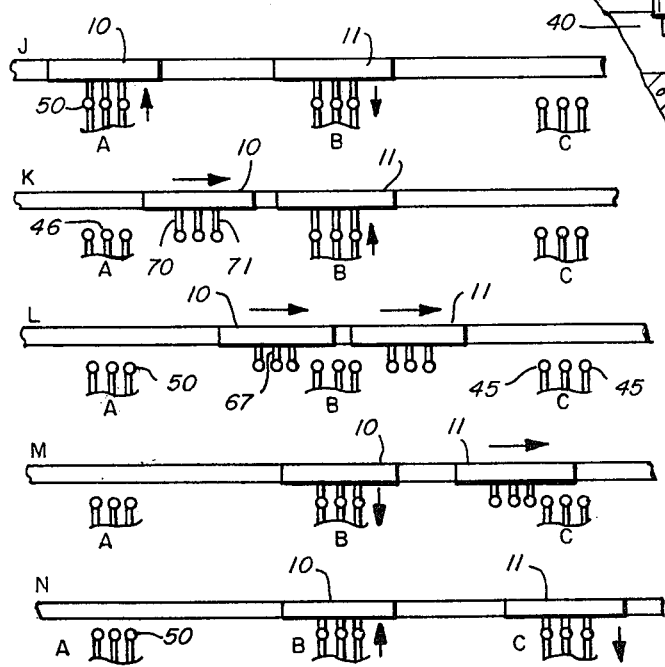

COMBINED DAY AND NIGHT SOLAR ENERGY SYSTEM

CROSS REFERENCE TO A RELATED APPLICATION

This is a continuation-in-part of my copending application Ser. No. 597,820, filed July 21, 1975 now abandoned.

BACKGROUND OF THE INVENTION

1. Field of the Invention

This invention relates generally to a system for generating electricity or other forms of energy by means of solar energy, and particularly to an improved storage structure for storing the solar energy for subsequent use during the night or other times when the sun is not available.

2. Description of the Prior Art

There are many different forms of energy that one can attempt to exploit, especially in view of the current energy crisis which has changed the relative economies of various energy sources. One of the sources of energy under investigation is solar energy. The drawback with the use of solar energy, however, is that it is only practical to use during the time that the sun is out, which time is only slightly more than 90% in those areas of the planet having the highest possible percentage of sunshine, and in most inhabited areas of the planet is not much more than 50%.

In view of this relative low potential utilization of solar energy equipment, various proposals have been brought forth for providing a solar energy system with a heat sink, or heat storage device, which permits the energy absorbed into the system from the sun to be stored for essentially continuous operation of the system. Examples of such proposals can be found in U.S. Pat. Nos: 2,933,885, issued Apr. 26, 1960, to E. K. Benedek et al.; 2,968,916, issued Jan. 24, 1961, to C. F. Taylor et al.; 3,029,596, issued Apr. 17, 1962, to R. J. Hanold et al.; 3,780,262, issued Dec. 18, 1973, to R. L. Rudd; and 3,847,136, issued Nov. 12, 1974, to N. P. Salvail.

Other examples of heat storage units can be found in my prior U.S. Pat. No. 3,678,919, issued July 25, 1972, as well as in U.S. Pat. Nos: 3,299,945, issued Jan. 24, 1967, to R. E. Rice et al.; 3,301,251, issued Jan. 31, 1967, to R. A. F. Jackson; 3,381,113, issued Apr. 30, 1968, to J. K. Jacques et al.; and 3,464,486, issued Sept. 2, 1969, to R. E. Rice et al.

SUMMARY OF THE INVENTION

It is an object of the present invention to provide an improved system for combined day and night usage for generating electricity or other forms of energy from solar energy.

Another object of the present invention is to provide an improved heat storage unit especially suited for use with a solar energy system.

It is yet another object of the present invention to provide an improved solar collector for use with a solar energy system, wherein the collector is movable so as to continuously focus rays from the sun as the sun moves in the sky.

It is yet another object of the present invention to provide a radiation energy collector system having at least two large collectors that are movable in a sequential manner.

These and other objects are achieved according to the present invention by providing a combined day and night energy system which receives energy from the sun and converts this energy into electrical or other useful energy in such a manner that the energy is available in both the daytime and the nighttime. More specifically, the system comprises a solar collector arranged for receiving the rays of the sun and concentrating such rays in order to heat a pipe arrangement containing a suitable heat transfer fluid. The system also comprises a boiler coupled to the solar collector by the pipe arrangement for converting the heat transferred to the fluid contained in the pipe arrangement into steam, and still further includes a steam actuated turbogenerator for generating electricity from energy imparted to the generator by the steam.

While the heat absorbed by the fluid contained in the pipe arrangement can advantageously be used directly to generate electricity, or other useful power, during periods of sunshine, the system also includes a heat storage unit according to the invention for permitting the system to generate power during the nighttime and other periods when the sun's rays are blocked from the solar collector. Preferably, the heat storage unit forms part of one assembly of the invention, which assembly also includes a generating unit and possibly a separate boiler, if such is required for generation of the requisite steam. The heat storage unit is preferably contained under ground and can be formed as a group of separate stacks, each comprising a plurality of plates constructed from twice-baked clay. Heat is transferred and stored in these plates by means of a plurality of heat conductive pipes interleaved between the twice-baked clay plates for transferring heat to the plates.

The efficiency of the system of the present invention is increased by the use of a solar collector that is movable and not fixed. More specifically, the collector assembly according to the invention advantageously includes two sequentially operated collectors, each including its own winding, or zig-zag, piping arrangement. The collectors are operated so that one collector is absorbing heat as it moves with the sun, while the other collector is already absorbed sufficient heat to be delivering steam to the turbogenerator or generators.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is a schematic, vertical, transverse sectional view of one of the collectors shown in FIG. 2 situated in a guide track.

FIG. 4 is a schematic, rear elevational view, partly cut away and in section with the section being taken generally along the line 4—4 of FIG. 3.

FIG. 5 is a schematic diagram showing a timing sequence which can be used to operate a system according to the present invention.

DESCRIPTION OF THE PREFERRED EMBODIMENTS

Figure 1A:
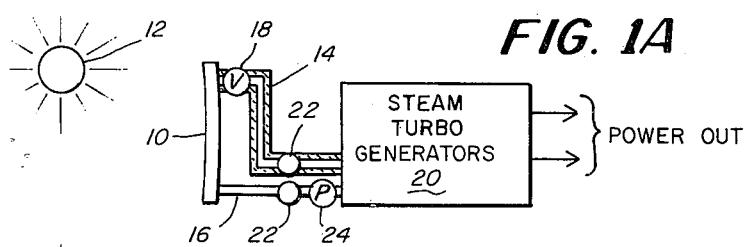
FIG. 1A is a schematic block diagram showing one possible embodiment of that portion of the system of the present invention which can be used in the daytime to generate power directly from radiation impinging on a collector of the system.
Figure 1B:
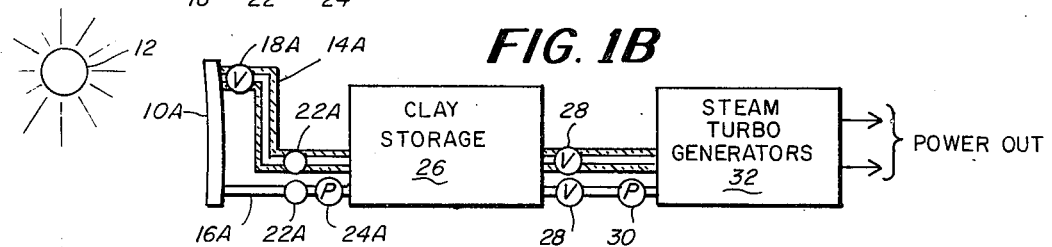
FIG. 1B is a schematic block diagram showing one possible embodiment of that portion of the system according to the invention which permits generation of power during the nighttime or other periods when the collector or collectors is not receiving radiation from the sun.
Figure 1C:
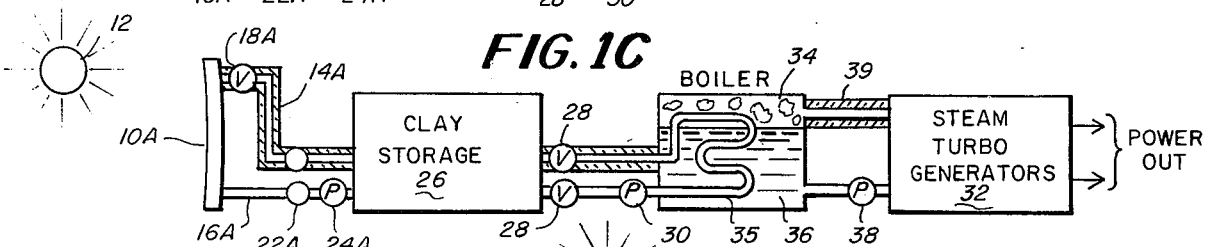
FIG. 1C is a schematic block diagram showing another possible embodiment of that portion of the system according to the invention which permits power generation during the nighttime and other periods when radiation is not being received from the sun.

Referring now more particularly to the figures of the drawings, the system of the present invention is preferably provided in two sections, one for daytime use and the other for nighttime use. FIGS. 1A and 1B show, respectively, a day system and a night system, while FIG. 1C shows an alternate arrangement to that shown in FIG. 1B. Because the available solar energy can only be collected in the daytime, the night system must be provided with a storage unit for storing the energy needed to provide power during the nighttime.

FIG. 1A shows schematically a solar collector 10 positioned to receive rays from the sun 12. The specific construction of collector 10 will be discussed in more detail hereinafter. Collector 10 can be constructed from a segment of a sphere, but preferably is a relatively flat element having a slight parabolic curvature. In addition, collector 10 is preferably of relatively large size, and can have dimensions of, for example, 30 meters by 45 meters by 3 centimeters thick.

Collector 10 includes a pipe arrangement partially formed by an outlet pipe 14 and associated return pipe 16. A conventional valve 18 is disposed in pipe 14. Because collector 10 is movable, and the steam turbogenerators designated 20 are not movable, there must be provided a disconnect device 22. A disconnect device 22 is provided in each of the pipes 14 and 16. Actually, pipe 14 and pipe 16 each comprise separate pipe sections, with a pump 24 being located in one of the sections of pipe 16. After the pipe arrangement of collector 10 has heated sufficiently, pump 24 is operated to force the steam thus generated by way of pipe 14 to the generators 20. Valve 18 is open during this operation. After a predetermined period of time, the steam is exhausted from collector 10, and pump 24 continues to pump cold water from turbogenerators 20 via pipe 16 to collector 10. The collector 10 then moves toward a new station, as will be described below, and the water in the pipe arrangement of collector 10 is heated during this movement.

FIG. 1A shows the daytime system wherein turbogenerators 20 can produce an electrical output directly from radiation from sun 12 impinging on collector 10. The steam turbogenerators 20 are of conventional design and construction and receive overheated steam via pipe 14. A boiler (not shown) is inserted between collector 10 and the turbogenerators 20 to insure a steady temperature of 600° F–700° F needed for an adequate functioning of the turbogenerators 20.

FIG. 1B shows schematically a system which is separate from that shown in FIG. 1A, and which is primarily intended for use only in the nighttime. Thus, the system shown in Fibure 1B comprises a collector 10A, a valve 18A, a pipe 14A, coupling members 22A, a pipe 16A and a pump 24A, all of which are identical to the elements 10, 18, 14, 22, 16 and 24 as employed with the arrangement shown in FIG. 1A. This portion of the system according to the invention also works in an identical manner to the arrangement previously described with regard to FIG. 1A. The only exception is that the overheated steam from pipe 14A is conveyed to a storage unit 26 constructed from a plurality of plates formed from twice-baked clay. Reference to a specific embodiment of storage unit 26 will be made below in conjunction with FIGS. 6A and 6B.

Storage unit 26 stores energy in the form of heat during the period in the daytime when collector 10A is receiving radiation from sun 12. The valves 28 are closed during the heat absorption period. During the nighttime, however, these valves 28 are open and a pump 30 is operated to force heated water or steam to conventional steam turbo generators 32. The water condensed in steam turbogenerators 32 and exhausted therefrom is pumped by pump 30 back to the twice-baked clay storage unit 26 where it is reheated. This pumping action continues and the overheated steam is continuously provided to the steam turbo generators 32 during the entire period of this night usage. The electrical output thus generated is taken from the steam turbogenerators 32 in a conventional manner and applied to an appropriate load (not shown).

FIG. 1C is substantially identical to FIG. 1B, but with the exception that in FIG. 1C a boiler 34 of conventional construction has been added to the assembly. The boiler 34 is necessary in order to provide the steam turbogenerators with an overheated steam of 600° F–700° F. This overheated steam is generated from the suitable liquid 36 which is vaporized by the overheated steam in the pipe 35 to overheated steam 34, and is subsequently pumped by means of pipe 39 to the steam turbogenerators 32. Pipe 39 has an asbestos cover in the manner of pipe 14A.

Figure 2:
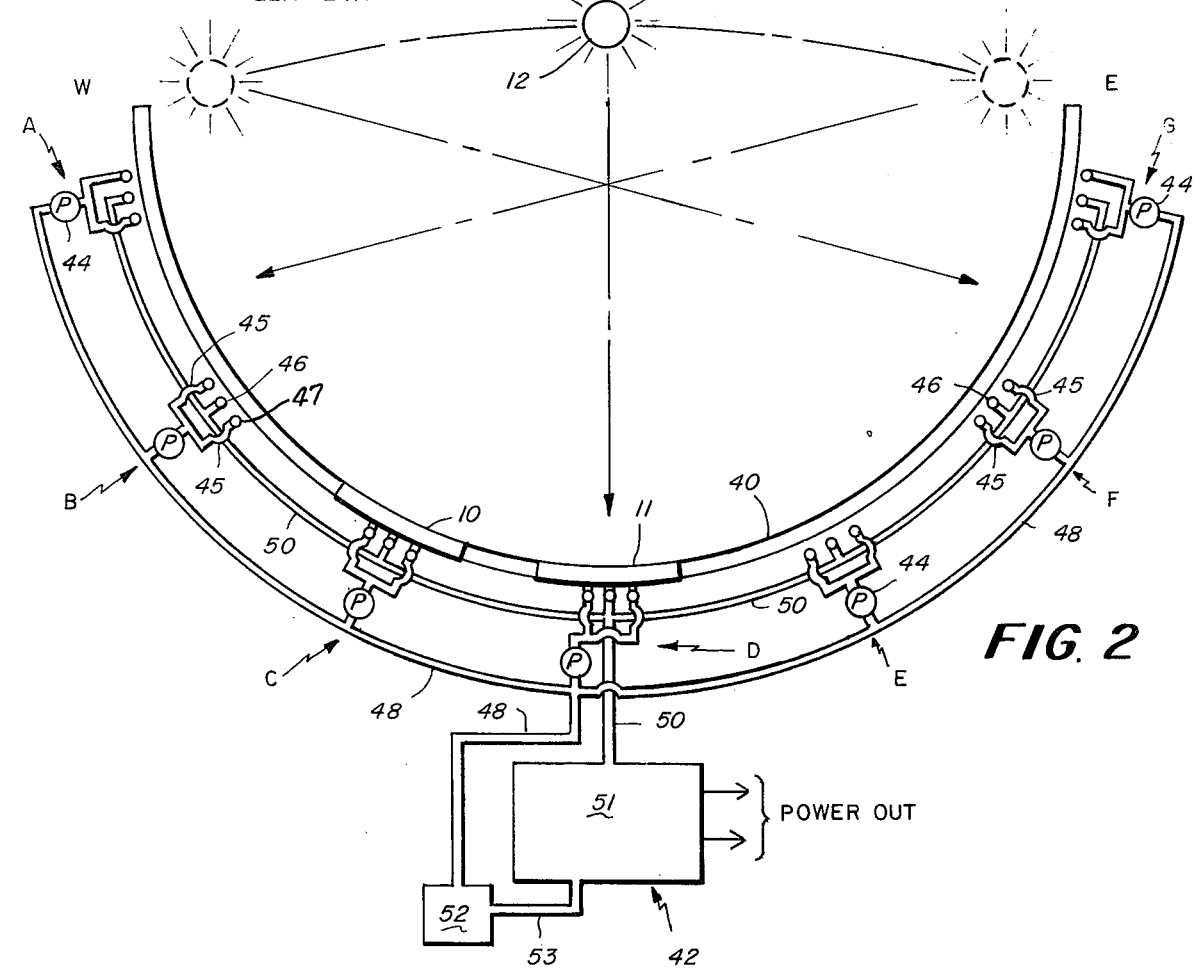
FIG. 2 is a schematic, plan view of a collector assembly according to the present invention and showing two sequentially operated collectors.

Referring now more particularly to FIGS. 2 through 4 of the drawings, a collector assembly according to the present invention will now be described. This assembly comprises a collector 10 and a collector 11, both of which are disposed within a track 40. The assembly also includes a plurality of stations A, B, C, D, E, F, and G, and steam turbogenerators 42. The track 40 extends in an arc and is arranged so as to be directed from east to west. The collectors 10, 11 would start in the early morning in a westerly direction so that the rays from sun 12, as shown by the direction arrows in FIG. 2, are received from the east, and the collectors 10, 11 would progress along track 40 in a manner to be discussed hereinafter. In FIG. 2, collectors 10, 11 are shown in their midday position with sun 12 directing its rays to the collector 11. The embodiment shown in FIG. 2 is primarily for purposes of illustration. In an actual embodiment, there might be 200 stations that could be spaced even further apart than the spacing indicated in FIG. 2. Each of the stations shown in FIG. 2 are substantially identical, and each includes a pump 44, input lines 45, and an output line 46 from the associated collectors 10, 11. Each of the lines 45 and 46 has a conventional disconnect device 47 to permit the collectors 10 and 11 to move along track 40 relative to lines 45 and 46. It will be appreciated that pump 44, lines 45 and 46, and disconnect devices 47 are similar to pump 24, lines 14 and 16, and disconnect devices 22, as described above. The collectors 10 and 11 are shown in a position wherein the pipes comprising a part of the collectors 10 and 11 are connected to stations C and D by means of the disconnect devices 47. The assembly shown in FIG. 2 also includes a common input line 48 and a common return line 50. Steam from the collectors 10, 11 travels through line 50 to the steam turbo generators 42. Cooled water is pumped by the pumps 44 in a selective manner via the line 48 to the connected collectors 10, 11. Steam turbo generators 42 advantageously comprise a conventional turbine 51, a condenser collector 52, and a pipe 53 interconnecting turbine 51 and collector 52. After the steam has been used in turbine 51, the condensed liquid is collected by collector 52 and pump 44, the latter of which is selectively operated for carrying the cooled liquid by means of pipe 48 back to the connected collector 10 or 11. The sequence of operation of the collector is controlled in a manner to be described below.

The collectors 10 and 11 are disposed extending into the track 40. This track 40 is defined in a concrete slab 41 of sufficient size to support the weight of the collector 10, 11. More specifically, the collectors 10, 11 are supported on roller bearings 58 which are suitably mounted on a base 60 of the associated collector 10, 11. The base 60 of each collector 10, 11 is advantageously formed of concrete, as is the outer shell 62 of the collector 10, 11. There are also provided vertical concrete reinforcing ribs 63 for rigidifying the structure. The outer shell 62 of each of the collectors 10, 11 defines a chamber for containing a pipe arrangement 64 which includes a vertical pipe 66 terminating in an output pipe 67. Pipe arrangement 64 also includes a similar pair of meandering, or zig-zag, pipe sections 68 and 69 which respectively terminate in inlet pipes 70 and 71. The pipes 67, 70 and 71 all connect by means of disconnect couplings 50 to the associated pipes of a respective one of the stations A, B, and sequence, when the collector 10, 11 is in the proper position in alignment with an associated station, as seen in FIG. 2. The inside of the shell 62 is lined with an asbestos material 72, and the like, for maintaining the heat collected by the collector 10, 11 within same. The surface collector 10, 11 facing the sun 12 is defined by a plurality of glass squares 74 which are darkened on their outer surface. Each of these squares may be, for example, 30 cm × 30 cm × 3 cm.

There can be provided as many as, for example, 3,000 squares 74, or even more. Because the collector 10, 11 is moved so as to continuously focus with sun 12, the water or other liquid in the pipe arrangement 64 is heated rather rapidly. The focusing of sun 12 is possible because of the distance of sun 12 from the solar collector 10, 11. The absorption of heat is enhanced by making each square 74 with a black unpolished surface. The squares 74 may be held together with a special heat resistant cement known per se.

For controlling the pipe arrangement 64, there are provided valves V1, V2, and V3, which are respectively disposed in the bottom of pipes 68, 66 and 69. These valves are basically in an open position when the collector 10, 11 is connected to a one of the stations A, B, and sequence, but are in a closed position when collector 10, 11 is moving between the stations A, B, and sequence.

The collectors 10 and 11 have been mentioned as moving along the track 40. There is disclosed herein two different techniques for moving the collectors 10, 11. In FIGS. 3 and 4, there is shown a cable 76 which is connected to a tab 78 provided at the base of the associated collector 10, 11. This cable 76 is either pulled so as to move the associated collector 10, 11 in accordance with a predetermined sequence to be described below, or limit switches (not shown) can be provided arranged in such a manner that the collector 10, 11 aligns itself properly with each of the stations A, B, and sequence, as indicated for collectors 10 and 11, and stations C and D, respectively, in FIG. 2.

Figure 7:
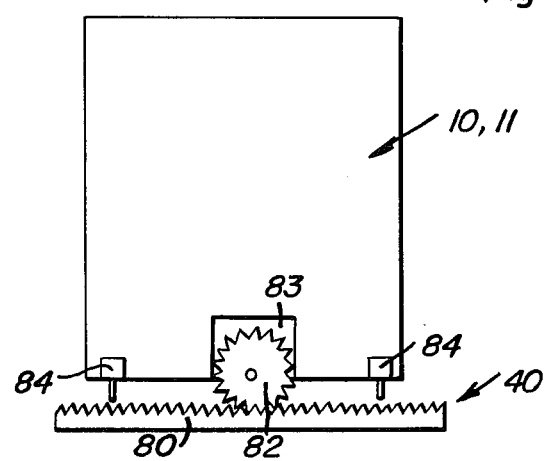
FIG. 7 is a schematic, front elevational view showing a motor drive arrangement suitable for propelling the collectors of the collector assembly according to the invention.

FIG. 7 shows in a somewhat simplified form another arrangement for driving the collector 10, 11 in a selective manner. In FIG. 7, there is shown the collector 10, 11 situated within the track 40. Adjacent to the track 40 there is provided a rack 80 which is engaged by a pinion gear 82 driven by a conventional motor 83. Also associated with collector 10, 11 are suitable limit switches 84. Motor 83 is selectively operated to drive the gear 82, which in turn engages the rack 80 and moves the entire collector 10, 11 along track 40. The limit switches 84 are used to sense the position of the collector 10, 11 and stop same at the proper time by deenergizing motor 83 so that the collector 10, 11 is in the proper position to connect with one of the stations A, B, and sequence.

FIG. 5 of the drawings shows an example of a sequence of operation for the collectors 10, 11. In position J, the collector 10 is coupled with station A and pump 44 is pumping cool liquid back into collector 10. At the same time, collector 11 has just reached station B and is delivering its steam under pressure to line 48 and subsequently to the turbo generators 42 (see FIG. 2).

In position K, collector 11 is still intercoupled at station B, but the associated pump 44 is operating to pump water into collector 11 has now expended all of its steam. At the same time, collector 10 is moving away from station A towards station B. As collector 10 approaches station B, as indicated in position L, collector 11 disconnects from station B and starts to move towards station C. In position M, collector 10 is now engaged at station B and is expelling its steam into the turbo generators 42. The collector 11 is still progressing toward station C. Finally, in position N, both of the collectors 10 and 11 are interconnected, respectively, at stations B and C.

Although not shown in FIG. 5, the valves V1, V2, and V3 must also be operated in the proper fashion simultaneously with the movements of collectors 10 and 11. When a collector 10, 11 is at a respective one of the stations A, B, and sequence, the valves V1, V2, and V3 can be opened, and when the collectors 10, 11 leave a station A, B, and sequence, the valves V1, V2, and V3 are then closed to permit steam to build up in the associated pipe arrangement 64. This opening and closing can be performed in a suitable manner as by the use of solenoid valves in a suitable control system.

In addition, when the arrangement shown in FIG. 7 for driving the collectors 10, 11 is employed, motor 83 is operated in accordance with a specific timing sequence. This timing sequence may be established by means of a conventional timer or controller which is not shown in the drawings, it being considered of conventional design. The controller functions to move the collectors in the manner discussed with reference to FIG. 5, whereby the motors 83 are operated in sequence and their operation may be interrupted upon arrival at a station A, B, and sequence, by means of the limit switches 84.

Figure 6A:
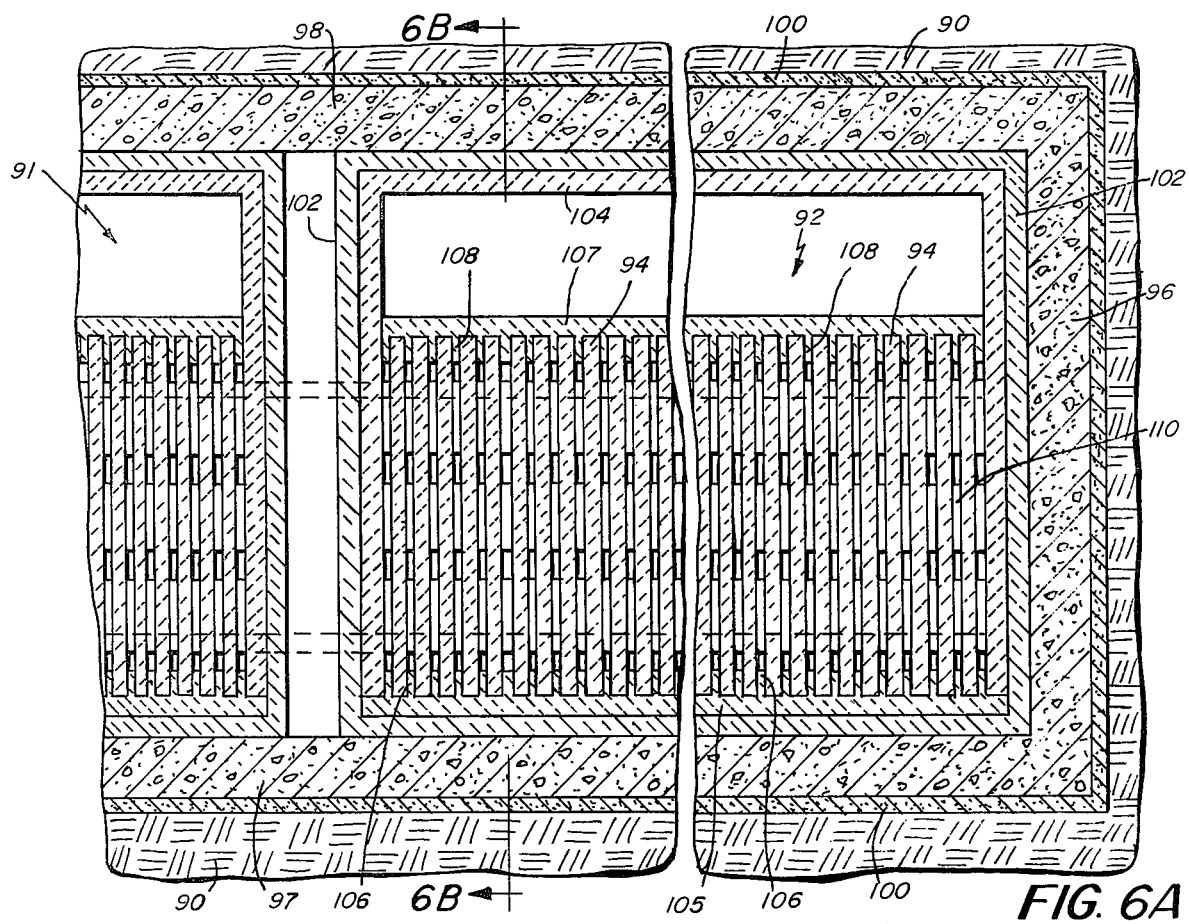
FIG. 6A is a fragmentary, vertical sectional view taken through a heat storage unit according to the present invention.

The heat storage unit 26 will now be described in conjunction with FIGS. 6A and 6B. This structure is preferably contained under ground, and is shown covered by earth 90. FIG. 6A shows two stacks 91 and 92 each comprising a plurality of plates 94 formed from twice burnt clay. While only two stacks 91 and 92 are illustrated, it is to be understood that a plurality of such stacks may be used, and can total ten or more such stacks arranged in parallel to each other.

The stacks 91 and 92 are arranged in a concrete housing including pillar 96. This pillar 96, together with a concrete base 97 and a cover plate 98, are preferably constructed of a cementitious material, such as concrete, and the like. A layer 100 of asphalt or a similar substance is provided over the concrete so as to be between the concrete and the earth at the top and bottom of the stacks and around the edges of the unit 26 as well in order to hermetically seal the hole storage unit 26.

The inside of the concrete structure formed by pillar 96, base 97, and plate 98 is lined first with an asbestos or similar insulating material. A layer 104 formed from twice-baked clay is placed over layer 102, and on top of layer 104 is positioned a plate 105 also formed from twice-baked clay and having spaced vertical flanges 106 of the same material. There is a similar top plate 107 also having vertical flanges 108 constructed from twice-baked clay. The plates 94 are disposed intermediate the flanges 106 and 108 on the bottom and top plates 105 and 107. The plates 94 can be about, for example, 175cm square and 4cm thick, and can be assembled in units of, for example, 100 plates 94 resting on plate 105.

The protrusions or flanges 106 and 108 serve as holders for the blocks or plates 94, and also add further to the volume of the twice-baked clay in which the heat may be stored.

The blocks or plates 94 are separated by spaces which are wide enough to allow uniform distribution of heat within the unit 26. In the embodiment shown in FIGS. 6A and 6B, a number of conductor pipes 110 are interleaved with the plates 94. In the preferred embodiment, these conductor pipes 110 interconnect between the stacks 91 and 92, and the like, in order to provide a continuous flow through unit 26. These pipes 110 are preferably constructed from twice-baked clay in order to avoid a difference between the coefficient of expansion of the pipes 110 and the plates 94 in view of the close proximity of the pipes 110 to the plates 94. The connecting pipes outside of unit 26 can be constructed of steel, and the like, preferably covered with a suitable insulating material, such as asbestos.

The space provided for the pipes 110, as defined by the flanges 106 and 108, may be about, for example, 30cm.

Figure 6B:
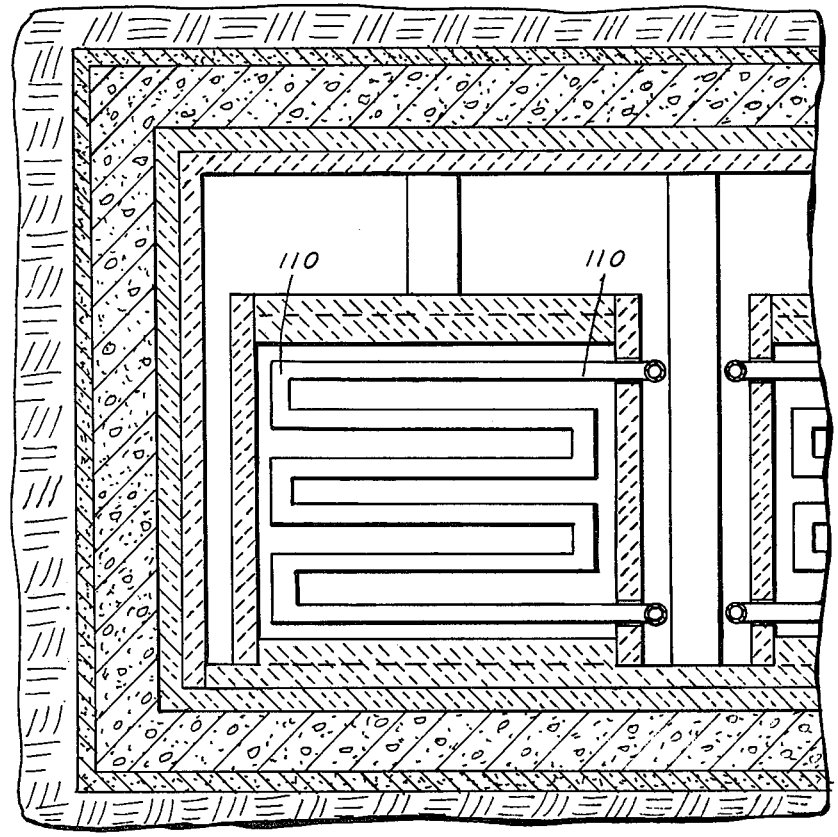
FIG. 6B is a fragmentary, sectional view taken generally along the line 6B—6B of FIG. 6A.

In operation, the unit 26 as set forth in FIGS. 6A and 6B receives heat conveyed from the solar collectors 10, 11 and stores such heat within the plates 94. During the nighttime, or other times when solar radiation is not avilable, this stored energy is convected away from unit 26 by means of the arrangement shown in FIGS. 1B and 1C, for example. During such energy conduction, the valves 28 are then opened and the pump 30 is operated to convey the heated liquid or vapor continuously to the turbo generators 32.

In a large installation, it is contemplated that there could be provided anywhere from 750 to 1,000 stacks of plates 94 such as stacks 91 and 92. It is also expected that the temperature will attain a value within unit 26 in the range of 1,000° C to 1,200° C. The twice-baked clay used in unit 26 has, in addition to high heat storage capability, the ability to withstand temperatures up to 2,500° C for long periods of time.

It is important that the clay that is used in unit 26, which clay may be red clay or kaolin, be twice baked or fired, in order to improve the hardness and durability of the clay, and render the plates 94 virtually maintenance-free.

Figure 8:
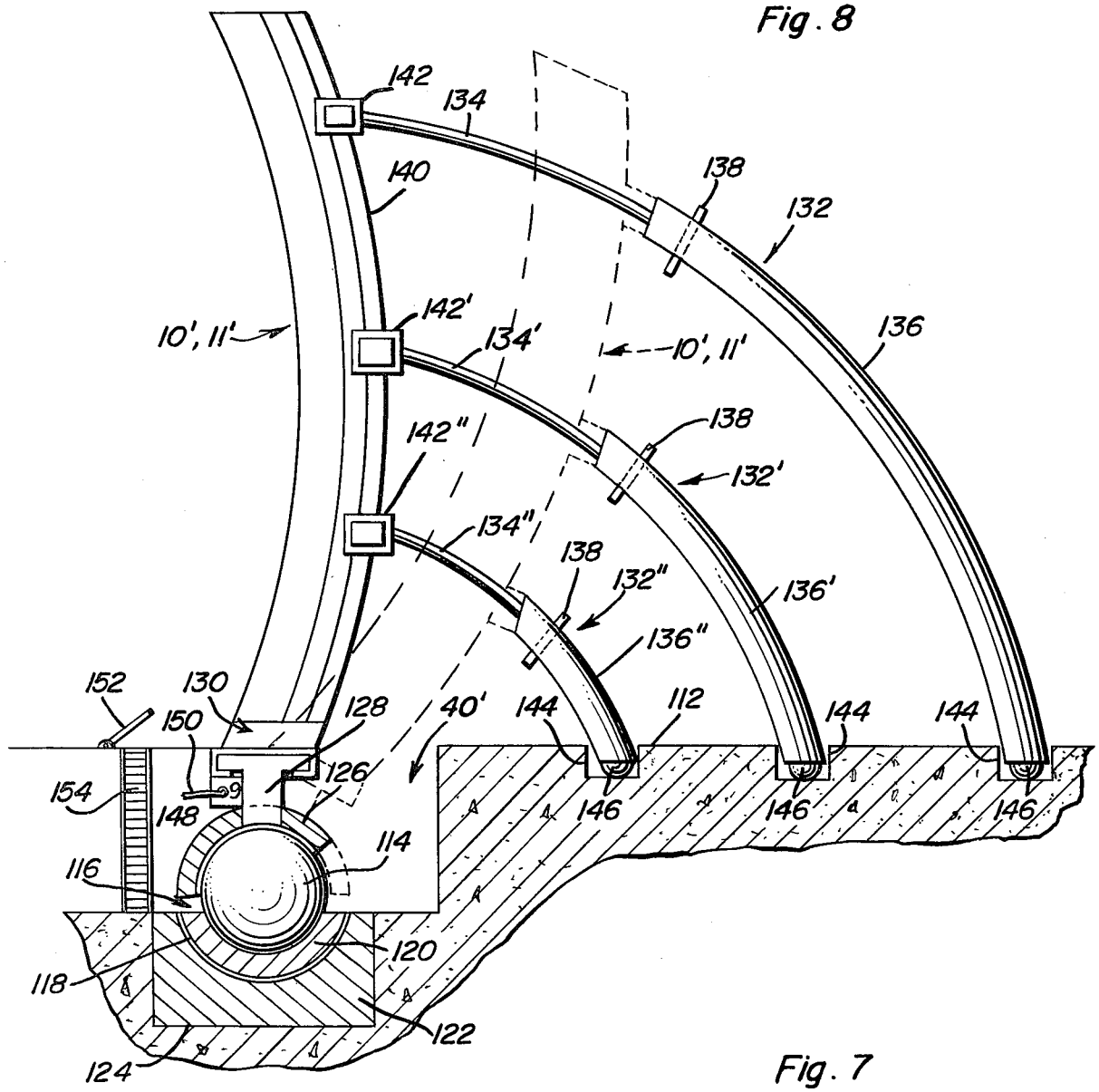
FIG. 8 is a fragmentary, schematic, vertical transverse sectional view showing a further embodiment of a collector according to the present invention.

Referring now to FIG. 8 of the drawings, there is shown an arrangement of a collector 10', 11' which may be tilted slightly relative to its direction of movement along a track 40'. The latter is formed in a concrete platform 112, and receives a ball 114 in a race 116 including a troughed backing element 118 provided with a graphite liner 120 and received in a concrete encasement 122 provided in a recess 124 formed in the bottom of track 40'. A cover 126 rides over the top portion of the ball 114 and has connected thereto a T-bar 128 received in a slotted track-portion formed on the lower face of a base 130 of the associated collector 10', 11'. By this arrangement, the collector 10', 11' can move along the longitudinal extent of track 40 by rotation of ball 114 while the configuration of cover 126 permits the collector 10', 11' to swing transversely about the longitudinal extent of track 40 in order to permit adjustment of the angle of the collector 10', 11' relative to the sun.

The collector 10', 11' is advantageously provided with a plurality of tubes 132, 132', and 132", each being of a different length. Each of the support tubes 132, 132', 132" includes a pair of sections 134, 134', 134" and 136, 136' and 136" which telescopingly fit together. A pin 138, or the like, can be provided for interlocking these two sections in predetermined positions. The back surface 140 of the collector 10', 11' has mounted thereon a plurality of longitudinal brackets 142, 142', 142" to which the sections 134, 134', 134", respectively, can be connected, while grooves 144 are provided in platform 112 to receive balls 146 permitting the tubes 132 to move along tracks formed by grooves 144 which are substantially concentric with the track 40'.

The tubes 132 may have suitable compression springs (not shown), and the like, disposed in the bottom portions of the sections 136, 136', 136" for biasing the collector 10', 11' toward the illustrated vertical position. Further, the longest tube 132 may be extended and contracted as by a suitable motor (not shown) in conjunction with a rack disposed along the outer extent of the section 134. By this arrangement, if the total inclination is to be 30°, this motor drive may be driven slowly so that the collector 10', 11' inclines at a rate of approximately 5° per hour. At the middle of the day, the motor is driven in the opposite direction to then swing the collector back to its vertical position.

Connected to the T-bar 128 is a lug 148 on which is anchored a cable 150 for moving the collector 10', 11' along the race 116 of track 40'. To facilitate maintenance of the ball 114 and race 116 arrangement of track 40', a hatch 152 is advantageously provided in platform 112 so as to permit access to a suitable ladder 154 permitting maintenance personnel (not shown) to enter track 40.

Operation of the Collectors of Figures 2-4 and 8

The tracks 40, 40' are preferably arranged such that the collector 10, 11 or 10', 11' starts to move from west to east at the precise instant that the first light rays of the sun fall on the collector. The arch of the track 40, 40' will cause these rays to strike the collector perpendicularly to the arc of the collector from sunrise to sunset because of the fact that the collector is always directly opposite the sun. In this way, the collector does not track the sun, but moves toward the sun on the sun's normal apparent trajectory toward the west.

With this, the best possible solution of the problem of efficient heat absorption of solar energy is achieved in that the sun and the collector move around a common imaginary center and at the same distance from the center. The sun's movement from east to west, as well as the collector's movement from west to east, correspond to the earth's rotation around the sun. This also makes possible a synchronized movement of both the earth and the sun so as to keep the sun and the collector directly opposite one another, or at an angle of 180°, as well as permitting the full solar sectional heat energy radiation to fall on the entire area of the collector at an angle of substantially 90° with respect to the collector.

The sun does not move only in a horizontal orbit. Soon after sunrise it starts to move above the horizontal line and reaches in this movement the highest point at approximately the noon hour. Then it declines back toward the horizontal line, crossing it again just before sunset. The collector 10', 11' shown in FIG. 8 is intended to compensate for this vertical movement of the sun in its orbit relative to the horizon.

The collector 10', 11' performs the aforementioned compensation by tilting until approximately noon backwards from the full line position shown in FIG. 8 to the broken position therein, and in the afternoon back forward from the broken line position to the full line position. Thus, the front surface of the collector always remains directly opposed and perpendicular to the sun so as to receive the maximum incoming solar heat energy from sunrise to sunset.

The latter is achieved as follows: on the sun's double synchronical horizontal and vertical movements, the sun's light rays come in contact with, for example, selenium cells (not shown) disposed in the crossing points of a, for example, reinforced concrete lattice supporting the glass squares 74. This contact establishes current in the selenium cells. This current is transferred to a control panel (not shown) advantageously situated near the central panel of the associated collector 10', 11'. On this control panel, there are situated points correcponding exactly to the position of the selenium cells on the collector. The current received at the points causes, in a known manner, swinging movement of the collector about a horizontal axis as a function of the received impulses, and if a motor drive, as shown in FIG. 7, is employed, can also cause movement of the collector along its track 40, 40'. In this manner, it is the sun itself which primarily initiates and proceeds to direct the movement of the collector 10', 11' when equipped with a motor drive, as shown in FIG. 7.

After sunset, the collector is returned to its starting point on track 40, 40' and is adjusted so as to meet the first rays of the sun with the sunrise on the following morning as a function of its exact geographical latitude.

It is to be understood that the three illustrated curved tubes as well as the ball 114 and associated cover 126, of a collector 10', 11' can be repeated along the longitudinal length of the collector 10', 11' so that there may be, for example, a total of nine tubes and perhaps three such balls 114 in associated covers 126.

Summary

As can be readily understood from the above description and from the drawings, a combined day and night solar energy system according to the present invention permits continuous power output with only the sun's input for energization. Because there are two collectors employed in this system, there preferably are two separate motors for driving these collectors by either of the approaches diclosed herein: namely, using cables or using a rack and pinion motorized arrangement. The system may also be provided with a monitoring panel for monitoring the activity of these motors as well as the different measurements of solar heat absorbed by the glass plates, the temperature of the water and the steam in the pipe arrangements, the steam pressure and flow at different points in the system, and the movement of the collectors. The display panels may be situated adjacent to the turbogenerators to allow a continuous supervision of the entire system. This system is also provided with suitable adjustment devices so that, for example, the tilting of the collectors can be made if so desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An energy conversion system, comprising, in combination:
    (a) first and second collector means for collecting radiation from a source of radiation, each of the first and second collector means including a pipe arrangement containing a fluid to be heated;
    (b) support means for selectively moving the first and second collector means along a predetermined path of movement;
    (c) power generating means for converting into useful energy the thermal power collected by the first and second collector means; and
    (d) station means disposed along the predetermined path of movement for selectively coupling the pipe arrangement of each of the first and second collector means to the power generating means.

2. A structure as defined in claim 1, further including heat storage means comprising a plurality of heat absorbent plates formed from twice-baked clay, and coupling means connected to the heat storage means and the first and second collector means for carrying heat to the storage means during periods when radiation from the source of radiation is impinging on the first and second collector means.

3. A structure as defined in claim 2, wherein the heat storage means includes control means for preventing conveyance of heat from the heat storage means to the power generating means during periods when radiation is impinging on the first and second collector means, and permitting conveyance of heat from the heat storage means to the power generating means at other times.

4. A structure as defined in claim 3, wherein the power generating means includes first and second generating assemblies, the first of these generating assemblies being connected directly to the first and second collector means, and the second of these generator assemblies being connected directly to the heat storage means.

5. A structure as defined in claim 2, wherein the heat storage means includes a plurality of pipe sections disposed between the twice-baked clay plates for transferring heat between a fluid contained in the pipe sections and the plates.

6. A structure as defined in claim 5, wherein the heat storage means further includes a top plate and a bottom plate both formed from twice-baked clay and each having a plurality of spaced flanges extending perpendicularly therefrom, the plates being spaced beneath and above the plurality of stacked plates, with the flanges extending between adjacent ones of the stacked plates in order to space the stacked plates from one another.

7. A structure as defined in claim 6, further including a concrete housing for containing the plates, the housing being covered by a layer of asphalt and by earth such that the heat storage means is contained totally underground.

8. A structure as set forth in claim 1, wherein the support means includes drive means for independently moving the first and second collector means.

* * * * *